June 28, 1927.    W. A. LORENZ    1,633,865
DISPENSER BOX
Filed Jan. 18, 1924    3 Sheets-Sheet 1
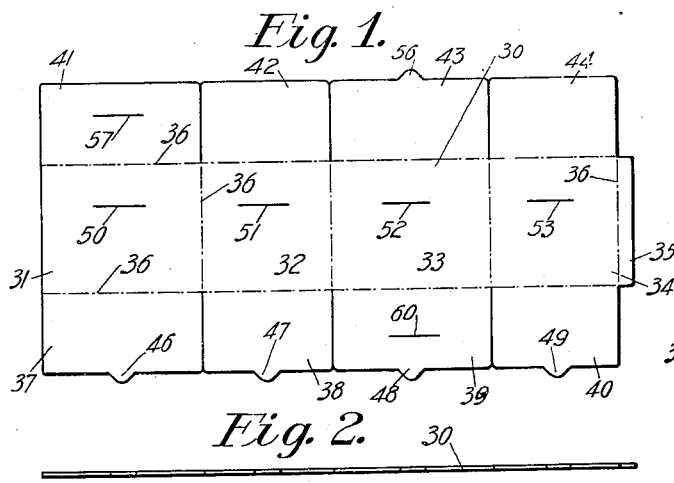
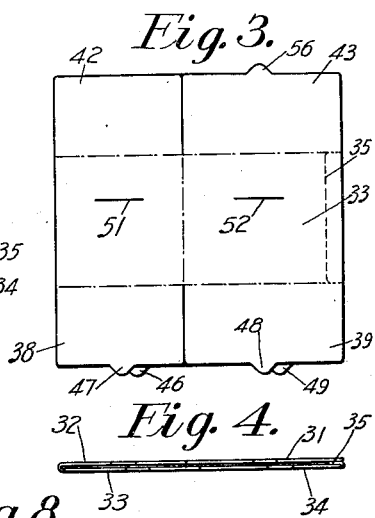
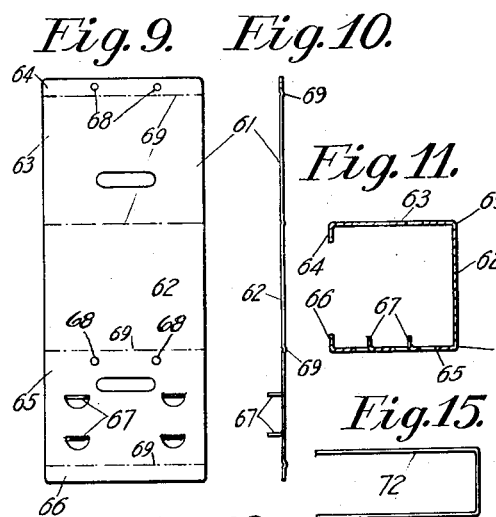
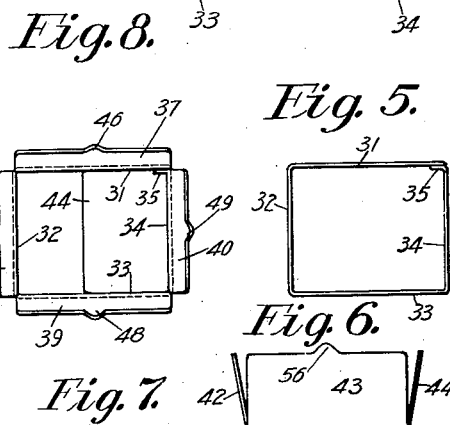
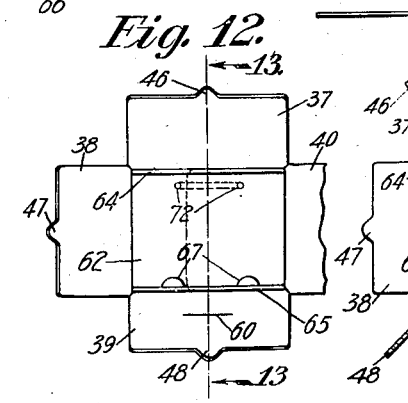
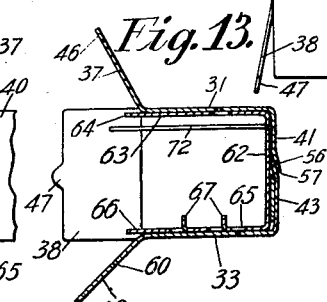
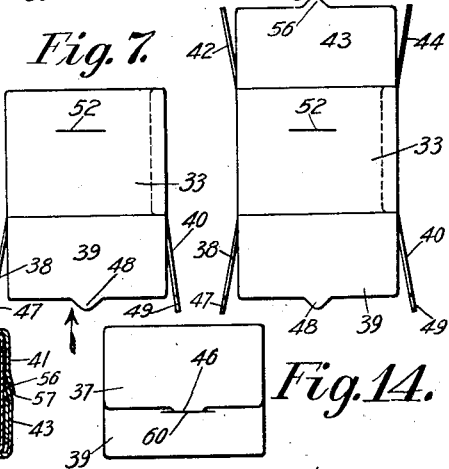
Inventor:
William A. Lorenz June 28, 1927.  
W. A. LORENZ  
1,633,865  
DISPENSER BOX  
Filed Jan. 18, 1924   3 Sheets-Sheet 2

Inventor  
William A. Lorenz

June 28, 1927.
W. A. LORENZ
DISPENSER BOX
Filed Jan. 18, 1924
1,633,865
3 Sheets-Sheet 3
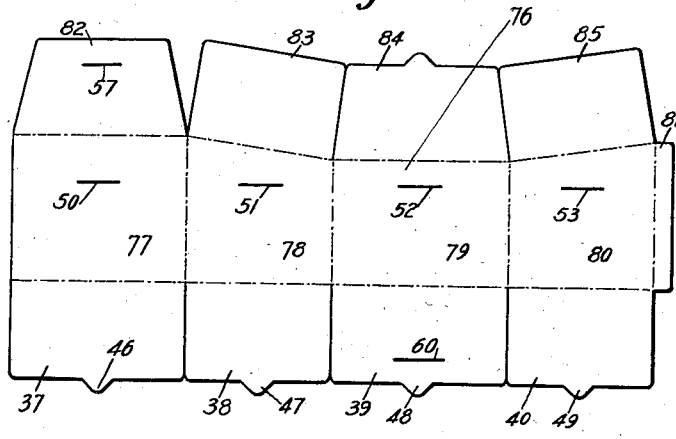
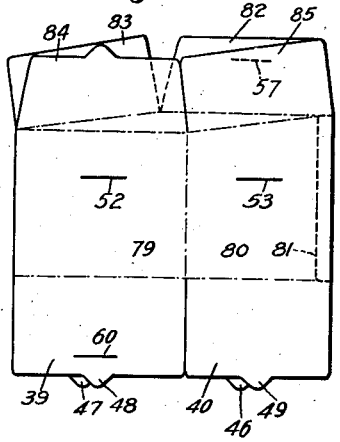
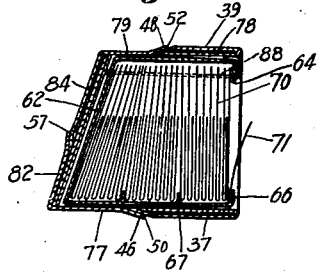
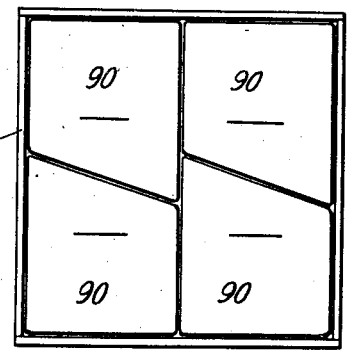
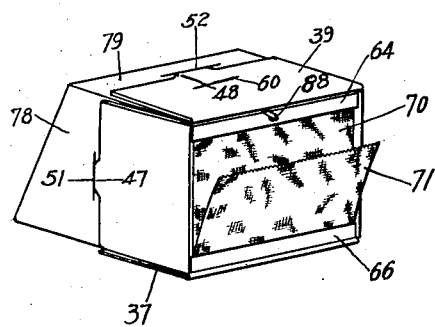
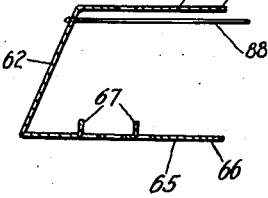
Inventor
William A. Lorenz Patented June 28, 1927.

1,633,865

UNITED STATES PATENT OFFICE.

WILLIAM A. LORENZ, OF HARTFORD, CONNECTICUT, ASSIGNOR TO THE OTAKA FABRIC COMPANY, OF HARTFORD, CONNECTICUT, A CORPORATION OF CONNECTICUT.

DISPENSER BOX.

Application filed January 18, 1924. Serial No. 686,993.

This invention comprises a box for dispensing articles, for example such articles as paper towels. These can be drawn from this box, one by one, without disturbing the others. This box may be made in a permanent box-like form, or as a knock-down or folding box. My improved box may be employed to advantage for shipping the articles to be dispensed, and, also, as a holder from which the articles may be dispensed.

Figure 16:
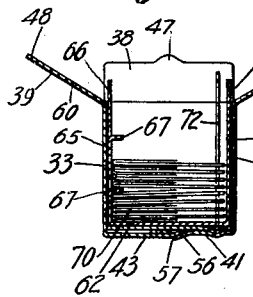
Figure 17:
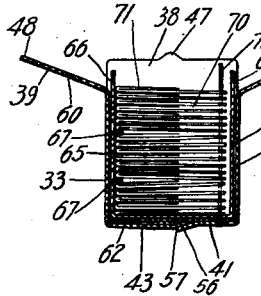
Figure 18:
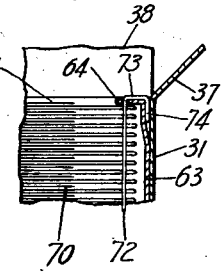
Figures 19, 20:
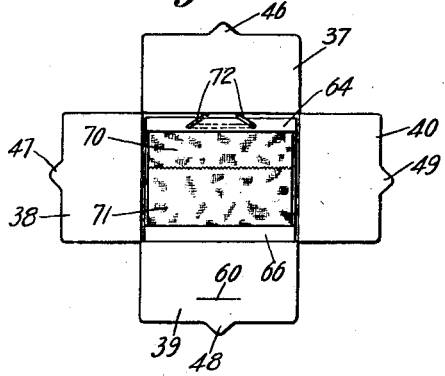
Figure 21:
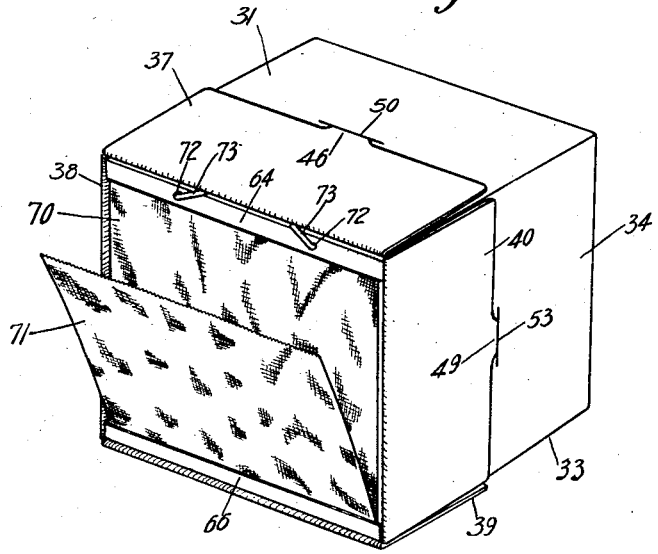

Referring to the drawings, Figure 1 shows a blank for a folding box, laid out flat, ready to be folded. Fig. 2 shows an edge view of Fig. 1. Fig. 3 shows the box doubled over in flat form and pasted together at one edge. Fig. 4 shows an edge view of Fig. 3. Fig. 5 shows an edge view of Fig. 3 when that blank has been doubled up into rectangular form. Fig. 6 shows the box of Fig. 3 opened up in rectangular form with the four flaps at each end, extending outwardly. Fig. 7 shows a side view of the box similar to Fig. 6, except that the four flaps at one end, have been folded. Fig. 8 shows a view of the box, looking in the direction of the arrow shown below Fig. 7. Fig. 9 shows a lining for the box in its flat form. Fig. 10 shows an edge view thereof. Fig. 11 shows an edge view of the lining, folded into rectangular form. Fig. 12 shows a plan view of the box of Fig. 8, with the flaps folded outwardly, and with the lining of Fig. 11 inserted in the box, and showing also two wire prongs inserted in the box. Fig. 13 shows a sectional view through the central portion of Fig. 12 taken on the line 13—13 of Fig. 12. Fig. 14 shows the box of Fig. 12 with the front flaps turned down and locked. Fig. 15 shows a side view of the wire form which is inserted in the box of Fig. 12. Fig. 16 shows the box of Fig. 13 half filled with towels which are strung upon the wire. Fig. 17 shows the box of Fig. 16 completely filled with towels. Fig. 18 shows a fragmentary view of the upper right hand corner of the box of Fig. 16, showing how the wires are doubled over and held in position at the top. Fig. 19 shows a plan view of Fig. 18 after the box has been filled with towels and the flaps are ready to be closed down. Fig. 20 shows the box of Fig. 19 completely closed and locked, showing some of the parts of the interior in dotted lines. Fig. 21 shows an enlarged perspective view of Fig. 19, with the four flaps turned back, and locked into the sides of the box, and also showing the towel ends which are held by the wires in the upper portion of the box, and the lower fold of the towel is shown sprung outwardly.

Fig. 22 shows a blank of a modified form of box, with an inclined back. Fig. 23 shows the blank doubled over upon itself, and pasted at one edge. Fig. 24 shows a sectional view of the box filled with towels, showing the towels strung upon the wire and showing the two box flaps turned against the top and bottom of the box and locked to the box. The lower fold of the towel is shown sprung outwardly, ready to be seized to remove it from the box. Fig. 25 shows a perspective view of the modified form of box. Fig. 26 shows a sectional view of the lining of the box of Fig. 24. Fig. 27 shows a bent wire which is used in this box. Fig. 28 shows how these boxes with inclined backs, can be packed in a shipping case, so as to form a rectangular package.

In the drawings 30 represents the blank for a rectangular box which is composed of four sections, 31, 32, 33, 34 and a strip 35 which is to be pasted to the other end of the section 31, as shown in Figs. 3 and 4.

The dotted lines 36—36—36 are creasing lines on which the box can be folded readily.

The blank 30 is provided with four flaps 37, 38, 39, 40, which are used to close the front of the box; it is also provided with flaps 41, 42, 43, 44, which are used to close the back of the box. The lower flaps are each provided with locks 46, 47, 48, 49, which are used when the flaps are turned backwardly upon the top, sides and bottom of the box, where they engage slots 50, 51, 52, 53 respectively, in order to hold these flaps against the sides of the box.

Flap 41 is provided with a slot 57, and flap 37 with a lock 46. When this box is folded and the back is closed, the lock 46 will engage the slot 57, and hold the flap. The flaps of the bottom of the box may be pasted together if desired, after the w e 72 has been inserted in the box.

When the blank 30 of Figs. 1 and 2 is folded over upon itself as shown in Figs. 3 and 4, the strip 35 is pasted to the upper portion 31 of the blank. In this condition the box blanks may be shipped.

When the blank is opened up as shown in Fig. 5 and the flaps 41, 42, 43, 44 are folded over, and the lock 46 engages the slot 57.

The box will then have the form shown in Fig. 7, leaving the front of the box with its flaps open, as shown in Fig. 8, in which the observer looks into the interior of the box or in the direction of the arrow shown at the bottom of Fig. 7.

In order to use this box as a dispenser box which will hold articles such as towels, I insert a liner 62, preferably of the form shown in Figs. 9 and 10; this liner has been creased at 69, 69; it is folded to the form shown in Fig. 11.

The liner is provided with turned up ears 67 which may be punched in the section 65 of the liner. The liner is creased on the four lines 69; this liner is provided with extensions 64 and 66, which are subsequently bent downwardly as shown in Fig. 11. This liner is also provided with two holes 68—68, and is also provided with two holes 68$^a$—68$^a$ punched in the extensions 64 for the reception of the wire 72.

The wire 72 of Fig. 15 is inserted below the liner and the two prongs of the wire are passed through the two holes 68—68, and extend upwardly as shown in Fig. 13. The extensions 64—66 extend in an upward manner so that the articles can be strung over the wire 72, and passed into the box. In Fig. 16 a certain number of articles, such as towels, have been inserted in the box, one group 70 being placed below the ledge 67. The other ends of the towels are perforated, and are passed over the wires 72.

In Fig. 17 the box has been filled; then the two ledges 64—66 are bent inwardly; the extension 64 is shown in an enlarged view in Fig. 18. The prongs of wire 72 are then passed through the holes 68$^a$, and the wires are bent at right angles over the extension 64, and may, if preferred, be also bent downwardly as shown at 74, thus holding the wires firmly.

The wires 72 are shown in Fig. 19. When the filling is thus completed the four flaps 37, 38, 39, 40, are bent over the open end of the box, and they may be locked by means of the lock 46 entering the slot 60. In this position these flaps may be pasted down, or otherwise secured as desired. The packages thus closed will be sanitary, and will exclude dust and other impurities.

When in use the box is placed on its bottom as in Fig. 21. The four flaps 37, 38, 39, 40 are folded backwardly; the lock 46 of flap 37 is shown engaging the slot 50; and the lock 49 of the flap 40 engages slot 53. All four flaps may thus be folded back and held in position.

When the box is placed on its bottom 33, the bottoms of the towels will be held back by means of the bent up lips 67. The upper portions of the towels, being held on the wires 72 and the towel fold 71, being free, will spring outwardly, so that the towel can be readily seized and removed from the box by stripping it from the wires 72. The flap of the next towel will then bend outwardly when it can be seized in a similar manner.

The box shown in Figs. 22 and 28 is a modified form of dispensers, in that the box is made angular or inclined at the back. This is done because some articles to be inclosed in the box may have less folds at the top than at the bottom, and by inclining the articles forwardly at the top, the lower shorter flap will spring outwardly and will be seized more readily, than when placed on a box with a vertical back.

I therefore make a blank 76 as shown in Fig. 22; the top and bottom parts 77 and 79 being similar to the parts 31 and 33 of Fig. 1. The two sides 78 and 80 each have one inclined edge to which flaps 83 and 85 are respectively attached. The parts 77 and 79 have flaps 82 and 84 respectively attached to them.

The flaps 37, 38, 39 and 40 are similar to the flaps shown in Fig. 1. When the blank of Fig. 22 is folded over and pasted at its edge, to the part 80, as in Fig. 23 and is then opened up, it will have a section like that shown in Fig. 24; the lining 63 of Fig. 26 with the wire 88 is secured in the box, and when filled with towels strung on the wire 88, the wire end is then passed through a hole in the extension 64, and it is then bent over and secured to 64.

To use this box the front is opened, and the four flaps folded back; these can be locked to the slotted sides, all as shown in perspective Fig. 25. The lower fold 71 of the towel will then spring outwardly, where it can be seized and removed by pulling the towel away from the box.

The inclined back may be more or less inclined, as desired; the box may be modified in many respects without departing from the spirit of this invention.

I claim as my invention:

1. A dispenser box for dispensing articles, said box having four walls and a back, in combination with a rod or wire held in the box at its back, and projecting beyond the front of the box to enable articles to be strung thereon, said box having a pivoted narrow projecting ledge near its front at the top of the box, provided with an opening through which the rod or wire is passed, after the box has been filled, said rod being bent over the ledge to hold the rod and ledge in position.

2. A dispenser box having four walls, a back and a front, in combination with a separate lining piece approximately filling the box at the top, the back and the bottom, said lining having relatively narrow ledges, one projecting downwardly at the top front, and one projecting upwardly at the bottom front, and a rod adjacent the top wall of said lining and supported at its forward end by said downwardly projecting ledge.

3. A folding dispenser box for dispensing articles, comprising a box having four walls, a back and a front, having a rod fixed in the box at its back, to enable articles to be strung thereon, said box having in its bottom wall and spaced from the front of the box projections extending upwardly to hold the articles at the bottom in the box.

4. A dispenser box for dispensing articles, having four walls and a back, and having a front, said front being provided with four flaps, each having a projecting lock, and each of the four walls being provided with slots into which the locks engage when the said flaps are folded back in order to keep the flaps open.

5. A dispenser box for dispensing articles, having four walls and a back, and having a front, said front being provided with four flaps, each having a projecting lock, and each of the four walls being provided with slots into which the locks engage when the said flaps are folded back in order to keep the flaps open, and having a rod or rods fixed in the box at its back to enable articles to be strung thereon.

6. A dispenser box having four walls, a front, and a back; a separate lining inside of and extending along the top, back and bottom of said box, said lining having at its upper front end a depending ledge; and a wire having a connecting portion between the lining and back and a pair of forwardly extending arms extending through the back wall of the lining and supported at their forward ends by said ledge.

Signed at Hartford, Connecticut, this 16th day of January, 1924.

WILLIAM A. LORENZ.